UNITED STATES PATENT OFFICE.

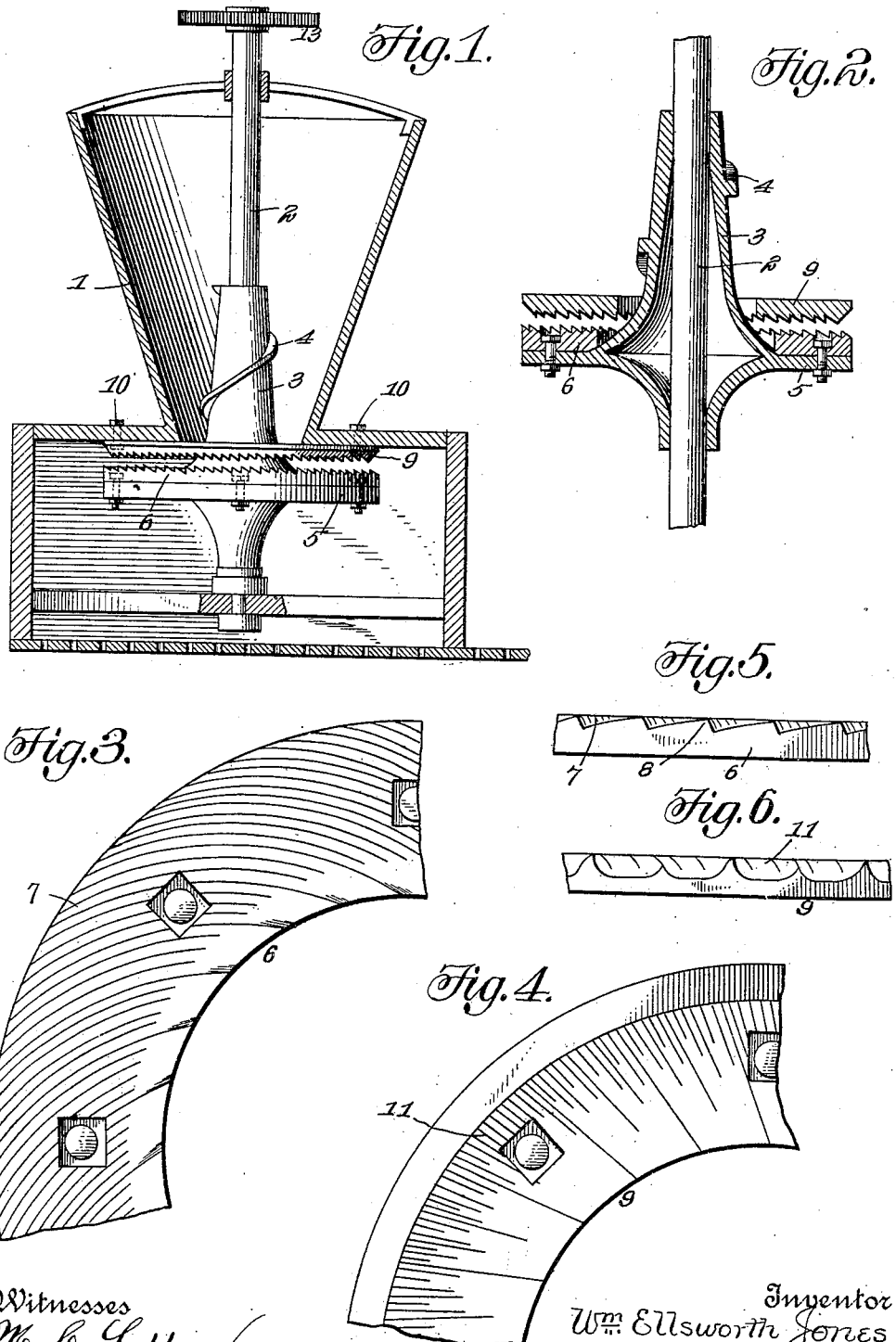

WILLIAM ELSWORTH JONES, OF WASHINGTON, DISTRICT OF COLUMBIA, ASSIGNOR TO OBADIAH A. PURDEY, OF WASHINGTON, DISTRICT OF COLUMBIA.

COTTON-SEED HULLER.

955,463.

Specification of Letters Patent.   Patented Apr. 19, 1910.

Application filed January 20, 1904.   Serial No. 189,850.

*To all whom it may concern:*

Be it known that I, WILLIAM ELSWORTH JONES, citizen of the United States, residing at Washington, District of Columbia, have invented certain new and useful Improvements in Cotton-Seed Hullers, of which the following is a specification.

This invention relates to cotton seed hullers and the object of the invention is to provide improved mechanism for removing the hulls from cotton seed and as far as possible leaving the kernels unbroken, without the necessity of first removing the lint from the seed.

With this object in view the invention consists in the improved construction, arrangement and combination of the parts of the mechanism for this purpose which will be hereinafter fully described and afterward specifically claimed.

In the accompanying drawings:—Figure 1, is a side elevation of the machine partly in section. Fig. 2 is a vertical sectional view of the interior mechanism. Fig. 3 is a face view of a portion of the lower one of the burs provided with curved ridges. Fig. 4 is a face view of a portion of the upper bur provided with radially extending straight ridges. Fig. 5 is an edge view of the bur shown in Fig. 3, and Fig. 6 is an edge view of the bur shown in Fig. 4.

The mill consists of the hopper 1 of any ordinary construction on which is a shaft 2, which is mounted in a hollow structure 3, provided with a spiral feed device 4 and made rigid with a horizontal disk 5. The lower bur 6, Fig. 3, is bolted to said disk and rotates therewith, and with the shaft. Said bur 6 is provided on its face with the curved ridges 7 and its inner edge is provided with the ridges 8, the spaces between which permit the seed to pass between the burs as will be hereinafter explained. The bur 9 (Fig. 4) is located above the bur 6, and may be provided with any suitable device such as the bolts 10 for adjusting its position. The said bur 9 is provided with the ridges 11, which extend in nearly radial directions, being tangential to a very small circle which would be concentric with the shaft, the inner edge of said bur being provided with the serrations 11 which are alternately high and low.

The seed having the lint thereon is placed in the hopper 1 and the shaft 2 is rotated by any suitable means, as for instance by power applied to gear 13. The spiral feed 3, causes the linty seed to pass down to the inner edges of the burs 6 and 9 and through the central opening of bur 6, landing on bur 9 at its inner edge at which point the seed is caught by the serrations 8 and 12 of the burs 6 and 9, and are drawn between the burs. As the bur 6 rotates the seed is rolled between the two burs and the lint thereon is finally caught in and between the ridges of the burs and pulled in opposite directions, thereby exerting a strain upon the hull of the seed, which strain causes the hull to split apart and leave the kernel in a whole state. The kernels, and the hulls with lint attached thereto, finally pass beyond the outer edges of the burs and may be separated by any suitable means.

Having thus fully described my invention what I claim as new and desire to secure by Letters Patent of the United States is:—

1. A mechanical means for removing the hulls of linty seed from the kernels consisting of an annular rotating bur and an annular stationary bur, one bur being provided with a single continuous series of tangentially curved ridges and intervening grooves, all beginning at the outer edge of the bur, and extending to the inner edge of the bur, and a plurality of intervening similarly curved ridges of equal length between each adjacent pair of full length ridges, said intervening ridges terminating at equal distances from the inner edge of the bur, the other bur being provided with a single continuous series of straight tangential ridges and intervening grooves, all beginning at the outer edge of the bur, said series of straight ridges comprising regularly spaced ridges extending to the inner edge of the bur, ridges intervening substantially centrally between said regularly spaced full length ridges, but terminating at a regular distance from the inner edge of the bur, and ridges between said intervening ridges terminating still farther from the inner edge of the bur.

2. An annular bur for cotton seed hulling machines provided with a single continuous series of straight tangential ridges and intervening grooves, all beginning at the outer edge of the bur, said series comprising regularly spaced ridges, all running at substantially the same angles to the radii, extending entirely across the bur to the inner edge thereof, and a plurality of intervening similar ridges between each adjacent pair of full length ridges terminating at points distant from the inner edge of the bur, said intervening short ridges being of different lengths and comprising in each section between full length ridges, a central ridge extending substantially three-fourths across the bur, ridges substantially central between the said central ridge and each full length ridge extending substantially one-half across the bur, and still shorter ridges between each three-fourths length ridge and each half length ridge, and each half length ridge and full length ridge, the grooves intervening between the ridges extending from the outer edge of the bur to the inner ends of the short intervening ridges, from which points they merge into wide grooves between adjacent full length ridges, extending to the inner edge of the bur.

In testimony whereof I affix my signature in presence of two witnesses.

WILLIAM ELSWORTH JONES.

Witnesses:
　LAWRENCE HUFTY,
　EDWIN L. WILSON.